(12) United States Patent
Fleischer et al.

(10) Patent No.: US 7,856,620 B1
(45) Date of Patent: Dec. 21, 2010

(54) SYSTEMS AND METHODS PROVIDING INTERACTION INTERFACES

(75) Inventors: Silke Fleischer, San Marcos, CA (US); Magnus Nirell, Sunriver, OR (US)

(73) Assignee: Adobe Systems Incorporated, San Jose, CA (US)

( * ) Notice: Subject to any disclaimer, the term of this patent is extended or adjusted under 35 U.S.C. 154(b) by 1119 days.

(21) Appl. No.: 11/526,921

(22) Filed: Sep. 26, 2006

(51) Int. Cl.
*G06F 9/44* (2006.01)
*G06F 3/00* (2006.01)

(52) U.S. Cl. .................. 717/109; 717/113; 715/762

(58) Field of Classification Search .......... 717/106–113
See application file for complete search history.

(56) References Cited

U.S. PATENT DOCUMENTS

2003/0151629 A1 * 8/2003 Krebs et al. .................. 345/810
2004/0201610 A1 * 10/2004 Rosen et al. ................. 345/731
2005/0188311 A1 * 8/2005 Diesel et al. ................. 715/730

OTHER PUBLICATIONS

Zak Ruvalcaba, "Micromedia Dreamweaver 8 Unleashed", Oct. 7, 2005, Sams, Chapters 14 and 16.*
Macromedia, "Captivate Getting Started with Captivate", (basic overview) Copyright © 2001-2004 Macromedia, Inc., manual pp. 1-48.
Macromedia, "Captivate Getting Started with Captivate", (user guide) Copyright © 2001-2004 Macromedia, Inc., manual pp. 1-248.

* cited by examiner

*Primary Examiner*—Wei Y Zhen
*Assistant Examiner*—Chung Cheng
(74) *Attorney, Agent, or Firm*—Kilpatrick Stockton LLP

(57) ABSTRACT

A method for creating an application comprises receiving input specifying a plurality of elements of a software application, said elements including interactions between a user and said software application, generating a dialog that includes a listing of said user interactions from said plurality of elements and is adapted to receive user input to edit one or more of said user interactions, and generating said software application based at least partly upon said received input and said user input to edit.

17 Claims, 5 Drawing Sheets

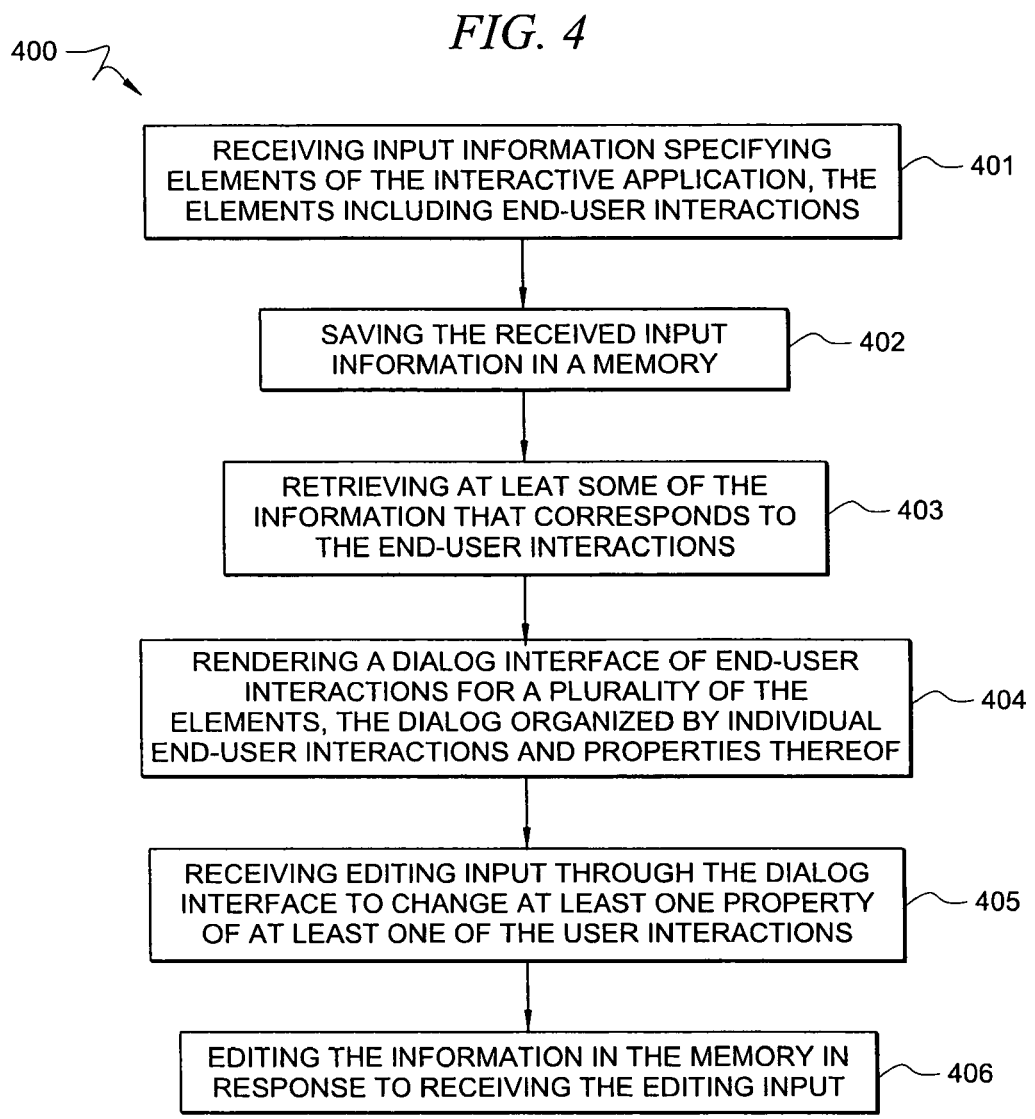

SYSTEMS AND METHODS PROVIDING INTERACTION INTERFACES

TECHNICAL FIELD

The present description is related, in general, to interactive applications and, more specifically, to displaying interactions during creation of an interactive application.

BACKGROUND OF THE INVENTION

When professionals develop training applications using eLearning tools, they typically create such applications section-by-section. The creation of each section often includes setting background and other art and also implementing user-interactive attributes (e.g., buttons that represent choices and cause an application to jump to different sections) in some of the sections. If later during the development process, the professional desires to go back and change one or more interactions in a previous section, the professional may have to search section-by-section until he or she finds the particular interaction, then edit the interaction in the section creation interface. This can be very burdensome, especially for large applications with many sections because using a "poke-and-peek" strategy may require looking through an unreasonable number of previous sections before the interaction is found.

One prior art solution has been to manually create a story board during the development process, wherein each section is laid out with its characteristics and interactions listed. A disadvantage of this solution is that it uses time and effort for something that is purely administrative and takes time and effort away from the development process. There is no solution currently available that allows a user to view and access interactions from a number of sections in a convenient and well-organized manner, thereby dispensing with the current section-by-section search approach.

BRIEF SUMMARY OF THE INVENTION

Various embodiments of the present invention are directed toward systems and methods for creating user-interactive applications, such as eLearning tools, web applications, rich content for web pages, games, and the like. In one example embodiment, and application development environment is provided that can be used by a developer to create such user-interactive applications. In this example, the developer creates an application section-by-section (e.g., by scenes, slides, or the like). At any time during the process, the developer can go to an advanced interaction interface that provides a view of, and editing access to, the various interactions in the application. In fact, the interface can be comprehensive such that it includes all interactions from all sections. Alternatively or additionally, the interface can include filters such that the numbers and types of interactions displayed to a developer can be limited.

An advantage of some embodiments is that a utility is provided where a developer can find and access any or all of the interactions in a single interface. Accordingly, some embodiments may obviate the need for an interaction story board or a section-by-section search approach that is associated with some previous techniques.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

FIG. 4 is an illustration of an exemplary method adapted according to one embodiment of the invention.

DETAILED DESCRIPTION OF THE INVENTION

Figure 1:
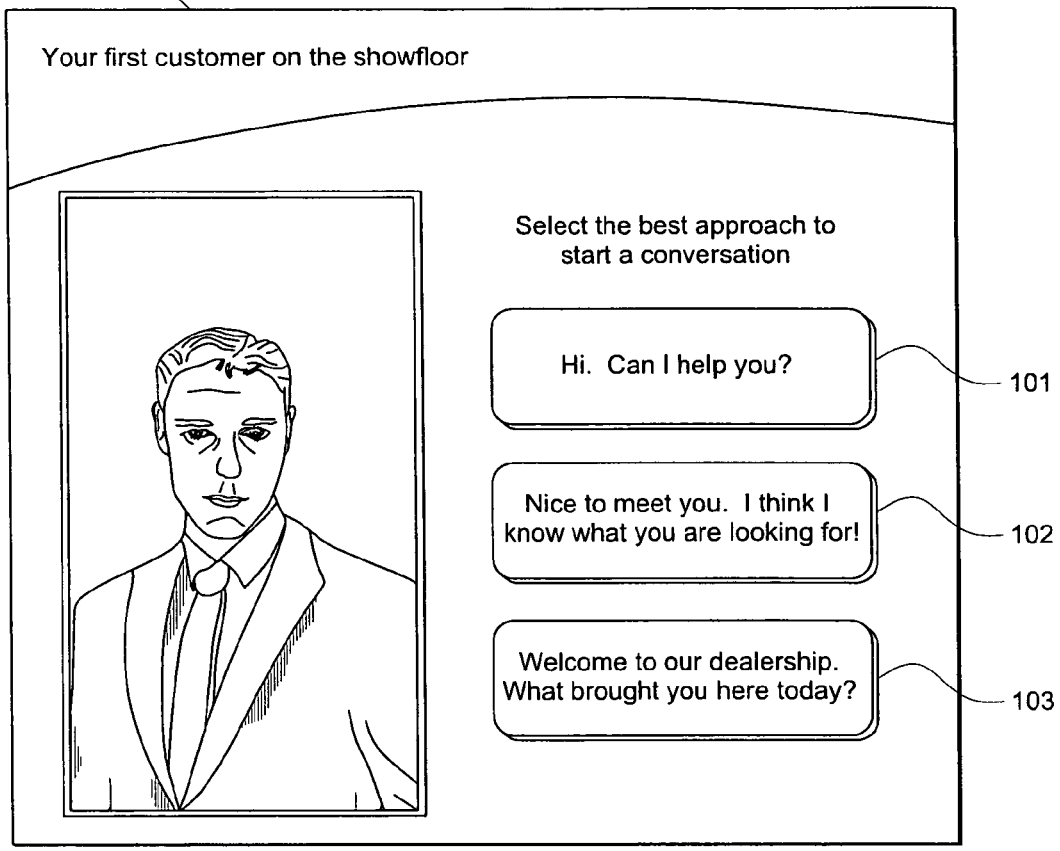
FIG. 1 is an illustration of an exemplary interactive slide adapted to be used with various embodiments of the invention.

FIG. 1 is an illustration of exemplary interactive slide 100 adapted to be used with various embodiments of the invention. Slide 100 may be one element of a larger user-interactive application that contains many slides similar to slide 100. Thus, in some contexts, slide 100 is an "element" while the larger user-interactive application is a "package."

Slide 100 includes interactive actionable attributes 101-103, often referred to as "interactions." In the example shown, interactions 101-103 include buttons that an end-user can choose from, using, e.g., a mouse. In this way, the end-user interacts with the application. As mentioned above, slide 100 may be part of a larger package. For instance, slide 100 may be the first of a number of slides, and interactions 101-103 determine how the user traverses through the application. For example, if a user selects button 101, then the application advances to slide X (not shown). Similarly, if a user selects button 102, the application advances to slide Y (not shown), and button 103 leads to slide Z (not shown). Each of slides X, Y, and Z, may also have their own branching possibilities.

Figure 2:
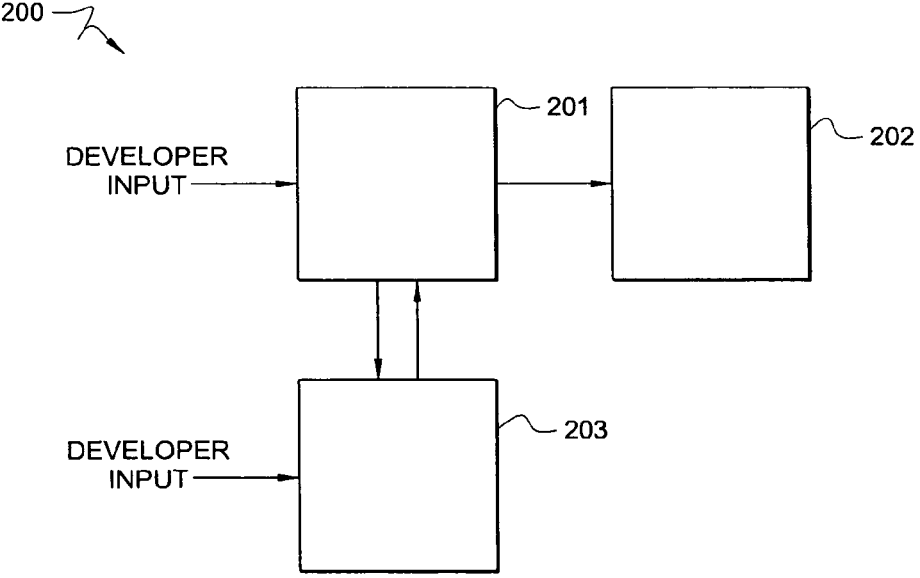
FIG. 2 is an illustration of an exemplary system adapted according to one embodiment of the invention.

FIG. 2 is an illustration of exemplary system 200 adapted according to one embodiment of the invention. System 200 includes development environment 201, advanced interaction dialog 203, and user interactive application 202. Development environment 201 is an environment wherein a developer may create a user-interactive application. Thus, in this example, a developer uses environment 201 to produce user-interactive application 202.

Developer input specifies elements and their attributes, number and type of interactions, and the like. Typically, elements are created one-by-one in an element creation interface tool (not shown). The element creation interface tool may include, for example, a thumbnail interface that shows thumbnails of the various elements and allows a user pull up a particular element in the element creation interface tool by selecting a desired element.

Various embodiments of the present invention may be used in the creation of any kind of user-interactive application or package. Examples include slide shows with slide elements, videos with scene elements, websites with page elements, and documents with form elements. Generally elements can be thought of as being static entities that are presented with specific, actionable attributes (interactions). For example, slides can have transitions and zoom features, scenes can have "jump-to" events, as in a DVD, webpages can have "next page" or "back page" calls, and forms can have many attributes per field per page.

During creation of the application, the developer may desire to edit one or more of the interactions. For example, edits to the types of interactions, scoring of the interactions, branching, and the like are possible in various embodiments. Rather than going through the application element-by-element to find the interaction of interest, the developer using environment 201 has the option to employ advanced interaction dialog 203.

Advanced interaction dialog 203 is an interface that displays information indicating various interactions and their properties. In fact, the list can be comprehensive as to the interactions in the application, such that the developer may view a list of all or substantially all of the interactions in one view. Some embodiments of the invention include filtering so that the number of interactions in the view may be decreased, for example, by filtering for type, scoring, branching, and the like. The interface provides a convenient reference point for the developer to view the interactions, even from among numerous elements, as well as providing an editing interface separate from specific tools used for editing elements.

Figure 3A:
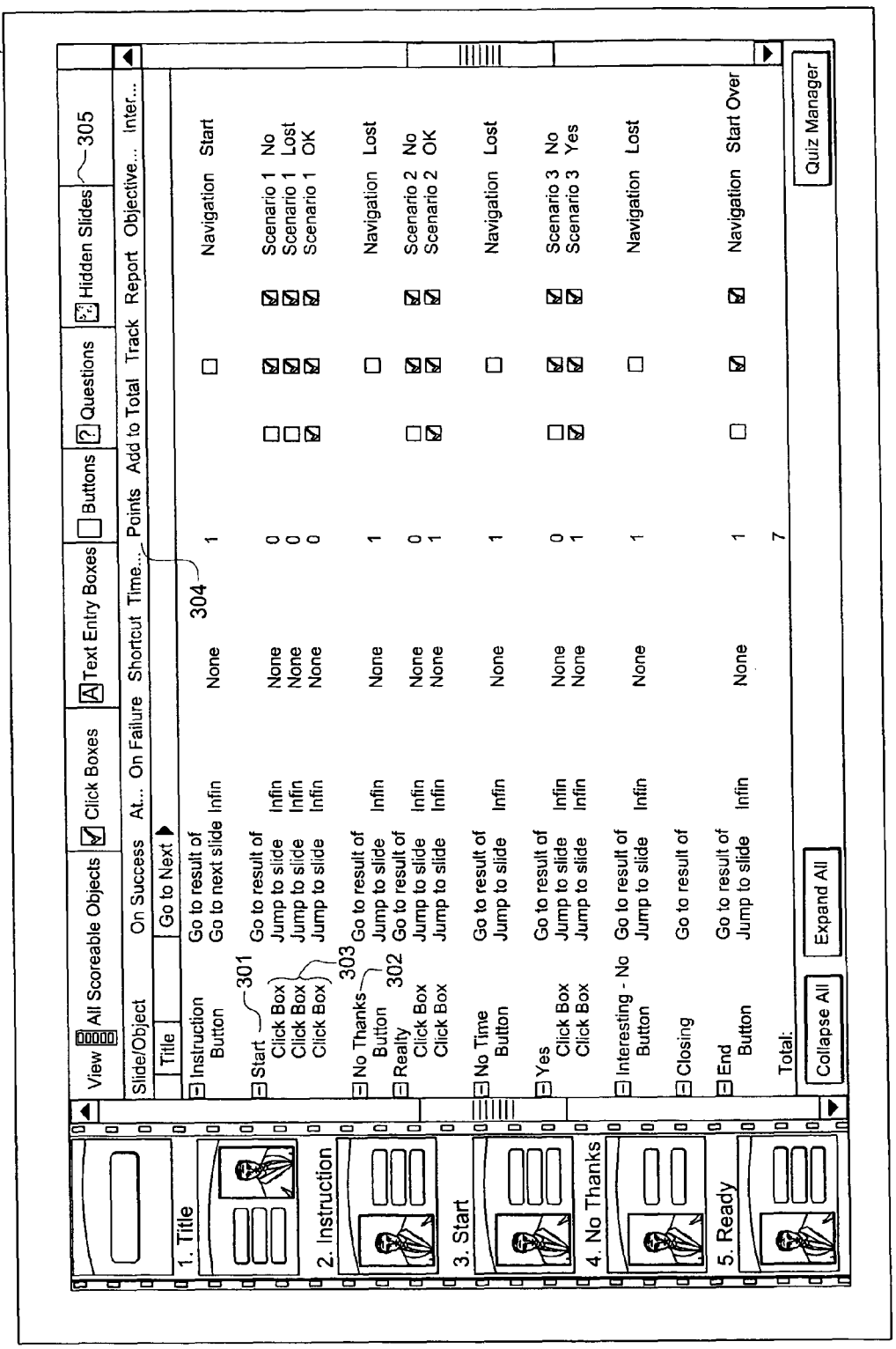
FIGS. 3A and 3B are illustrations of an exemplary dialog adapted according to one embodiment of the invention that may be rendered by a development environment.
Figure 3B:
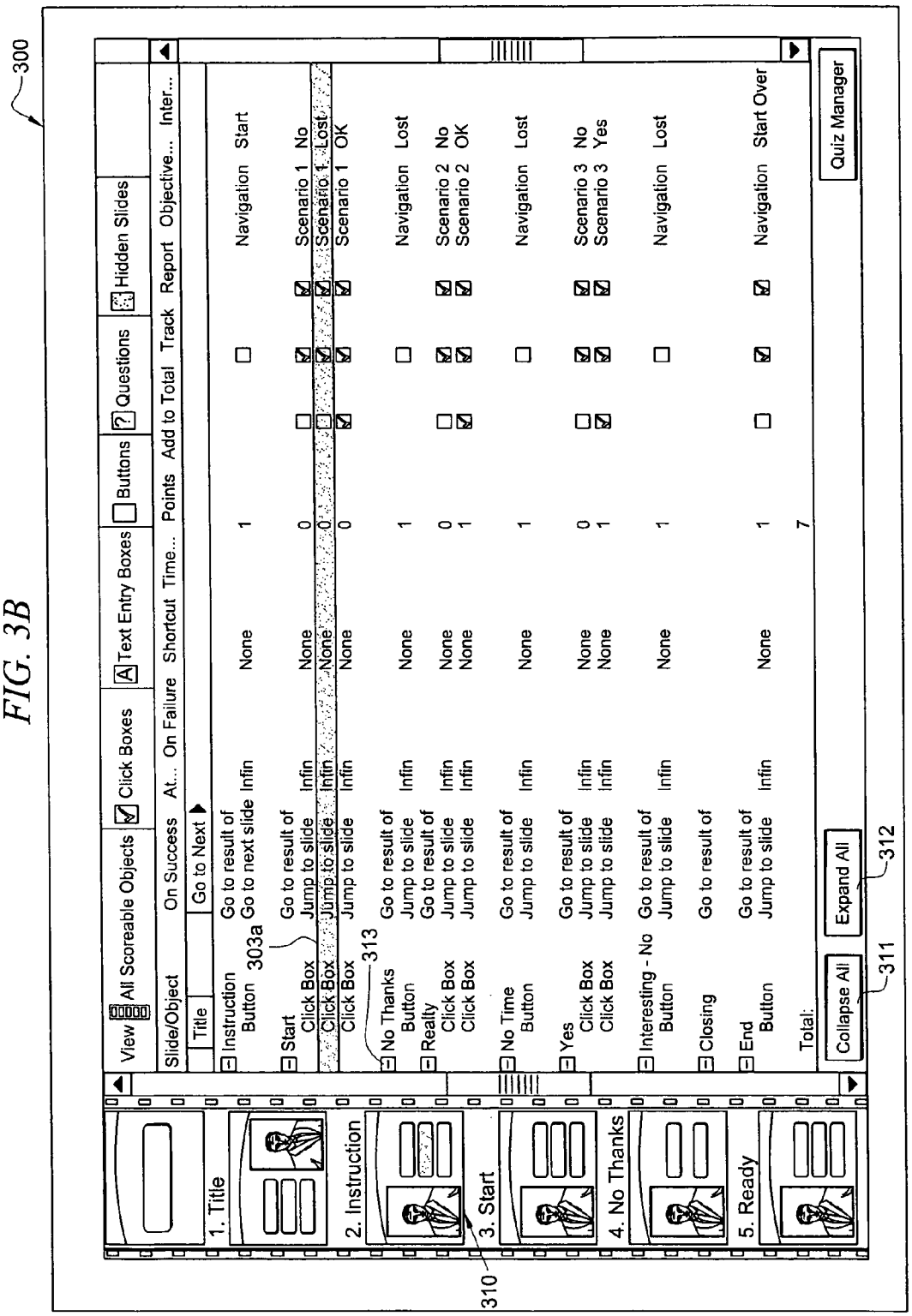

FIGS. 3A and 3B are illustrations of exemplary dialog 300 adapted according to one embodiment of the invention that may be rendered by a development environment. Dialog 300 is tabular in format and includes a listing of various interactions and the elements to which they correspond. Scene titles 301 and 302 are examples of listings of elements, while interactions 303 shows three click box-type interactions corresponding to the scene named "Start." Thus, in this example, the ordinate contains each interaction on each page, and each interaction has its own row. Across the abscissa are the interactions' characteristics. A developer may select a particular interaction or may select a scene. By selecting a scene, the developer has instant access to the interactions for that element and may change the characteristics of those interactions.

For instance, column 304 is labeled "Points," and it allows a developer to change the point values of any one of the various interactions. Other columns allow a developer to change branching possibilities ("On Success" and "On Failure") and whether points are added to totals, tracked, and/or reported. In one example, a user desires to change the point value of a particular interaction and to specify that the points are to be added, tracked, and reported. Such settings are often used in eLearning applications that associate a scale of points with various end-user choices and then grade the end-user's learning based on the point total. Point grading schemes can be used in addition to or alternatively to branching schemes (described above). For example, in one interaction, an incorrect choice may be worth zero points, whereas a partially correct choice may be worth one point, and a preferred correct choice worth three points. A developer can set and specify this point scale using dialog 300 and, in fact, can set and specify point scales for a plurality of interactions from column 304 within dialog 300. The developer may also use dialog 300 to specify that the points from any of the interactions are added to a total, tracked, and reported to the end-user so that the end user can see his or her cumulative grade while progressing through the application. In such an example, dialog 300 may contribute to ease of use for the developer, since the developer can view and manipulate characteristics for a plurality of interactions from a single dialog. It should be noted that embodiments of the invention are not limited by interaction type or characteristics of those interactions.

Further, tabs 305 allow a developer to filter the view shown in dialog 300. In the example shown, the filter is set to show all interactions of all slides. However, the filter can be set to limit the display to click boxes, text entry boxes, buttons, questions, or hidden slides. Other kinds of interactions are possible in some embodiments, including, but not limited to, voice responses, joystick responses, and the like.

FIG. 3B illustrates additional visual features that may be included in some embodiments. In the example of FIG. 3B, a developer has selected interaction 303a by moving a cursor over it and clicking (although any manner of selecting an item in dialog 300 is possible in various embodiments). The row in which interaction 303a is located is then highlighted for the convenience of the user. As well as highlighting the row, the development environment also highlights the corresponding interaction in thumbnail 310. In addition to or alternatively to highlighting, any other kind of visual accent may be used. This may add to ease of use for the developer by allowing the developer to quickly associate the selected line item with the actual interaction in the slide.

If a given application has many different elements and interactions, the number of interactions in a given view may get quite large. Accordingly, dialog 300 includes collapse button 311 that is operable to collapse all selected rows at once and include expand button 312, which is operable to undo the collapsing. Additionally, button 313 and similar other buttons by each element title are operable to collapse and expand the interactions for a given scene.

An example of a development environment that may be adapted according to embodiments of the invention is ADOBE CAPTIVATE™, available from Adobe Systems Incorporated. The ADOBE CAPTIVATE™ development environment can be used for creating eLearning applications that interact with end-users. In example applications created using ADOBE CAPTIVATE™, users choose from among a number of possible interactions, with the consequences of their choices being different branching paths through the application. It is also possible to score choices and base an end outcome on a total score, thereby grading end-users. In addition to eLearning applications, other kinds of applications can be created using development environments adapted according to embodiments of the invention. For instance, development environments for any kind of user-interactive applications may benefit, including for such applications as interactive television applications, video games, gambling applications, and the like.

FIG. 4 is an illustration of exemplary method 400 adapted according to one embodiment of the invention. Method 400 may be performed, for example, by a computer executing a development environment program similar to environment 201 of FIG. 2. In step 401, the environment receives input information specifying elements of an interactive application, the elements including end-user interactions. For instance, a developer may create pages, slides, or other elements, and the like. Some of the elements include end-user interactions specified by the developer. The receiving performed by the development environment may include receiving user input through an electronic interface, such as a text interface, Graphical User Interface (GUI), or the like.

In step 402, the environment saves the received input information in a memory. The memory can be any kind of memory, including but not limited to Random Access Memory (RAM), Flash memory, Read Only Memory (ROM), optical or magnetic disks, and the like. The information can be arranged in the memory in any format, including, for example, a database.

In step 403, the environment retrieves at least some of the information that corresponds to the end-user interactions. In step 404, the environment renders a dialog interface of end-user interactions for a plurality of the elements. The dialog is organized by individual end-user interactions and properties thereof, and it is based on the retrieved information. An example of a dialog according to some embodiments is shown as dialog 300 of FIGS. 3A and 3B, which is a FLASH™-based interface. Other kinds of interfaces may be used in various embodiments, including interactive interfaces employing Hypertext Markup Language (HTML) code, JAVA™ and/or JAVASCRIPT™, and the like.

In step 405, the development environment receives editing input through the dialog interface to change at least one property of at least one of the user interactions. The input may include, for example, input generated from a keyboard, computer pointing device, touchscreen, microphone, joystick, or any other user input device. Such editing may include setting, resetting, or changing any of the properties of one or more of the interactions in the dialog. Step 405 may also include rendering highlighting or other accent for user-selected items in the dialog interface, such as, for example, highlighting a selected interaction both in an editing portion of the dialog and in a slide-view portion.

In step 406, the development environment edits the information in the memory in response to receiving the editing input. Thus, at least one of the interactions is edited through the dialog interface, rather than through, for example, a scene-by-scene element creation interface. However, use of a scene-by-scene element creation interface for editing some interactions is not precluded in some embodiments.

While method 400 is described as a step-by-step process, various embodiments of the invention may rearrange the order of steps, add steps, or eliminate steps. For instance, steps 403-406 may be repeated without steps 401 and 402. Also, other non-interactivity-related characteristics of elements (e.g., backgrounds, images, orientations, and the like) may be viewed and edited in addition to the interactions in the dialog.

Some embodiments of the invention may provide one or more advantages over prior art solutions. For instance, some embodiments give developers access to a comprehensive grouping of interactions in a single view. From this view, interaction components can be edited, and the view can even be filtered by interaction type for ease of use in some embodiments. This has the possibility to save developers time and gives them a way to track interactions inside the development tool without relying on external storyboards or documents.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 5:
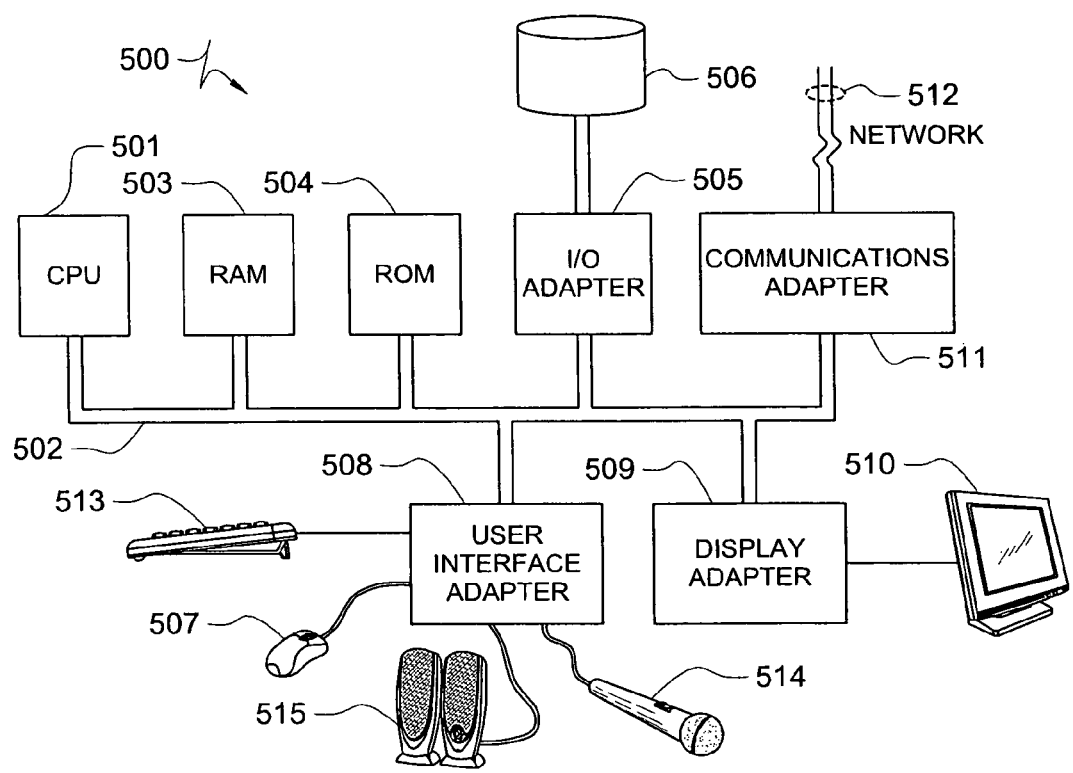
FIG. 5 illustrates an example computer system adapted according to embodiments of the present invention.

FIG. 5 illustrates an example computer system 500 adapted according to embodiments of the present invention. That is, computer system 500 comprises an example system on which embodiments of the present invention may be implemented. Central processing unit (CPU) 501 is coupled to system bus 502. CPU 501 may be any general purpose CPU. However, the present invention is not restricted by the architecture of CPU 501 as long as CPU 501 supports the inventive operations as described herein. CPU 501 may execute the various logical instructions according to embodiments of the present invention. For example, CPU 501 may execute machine-level instructions according to the exemplary operational flow described above in conjunction with FIG. 4.

Computer system 500 also preferably includes RAM 503, which may be SRAM, DRAM, SDRAM, or the like. Computer system 500 preferably includes ROM 504 which may be PROM, EPROM, EEPROM, or the like. RAM 503 and ROM 504 hold user and system data and programs, such as code defining, at least in part, a development environment according to some embodiments of the invention. Such memory may also hold settings and properties for elements and interactions.

Computer system 500 also preferably includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information, such as when editing interactions.

I/O adapter 505 preferably connects to storage device(s) 506, such as one or more of hard drive, compact disc (CD) drive, floppy disk drive, tape drive, etc. to computer system 500. The storage devices may be utilized when RAM 503 is insufficient for the memory requirements associated with storing data. Communications adapter 511 is preferably adapted to couple computer system 500 to network 512. User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, display the user interface (such as that of FIGS. 3A and 3B) of embodiments of the present invention.

It shall be appreciated that the present invention is not limited to the architecture of system 500. For example, any suitable processor-based device may be utilized, including without limitation personal computers, laptop computers, handheld computing devices, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, by a computing system comprising a processor, input specifying a plurality of elements of a software application, said elements including interactions to be available in a user interface of said software application;
generating, by the computing system, a dialog that includes a listing of said interactions from said plurality of elements in a tabular format, the dialog adapted to receive input to edit one or more of said interactions; and
generating, by the computing system, said software application based at least partly upon said received input and said input to edit,
wherein the tabular format listing said interactions includes a plurality of columns and a plurality of rows, including a row for each of said interactions, the rows for interactions associated with an element of said software application nested beneath a row corresponding to the element,
wherein generating the dialog comprises providing a collapse command operative to hide at least one row of the plurality of rows,
wherein each interaction is defined by a plurality of characteristics,
wherein each column corresponds to a characteristic of said interaction, and
wherein the columns comprise:
a column corresponding to a score characteristic of at least one said interaction, and
a column corresponding to a branching characteristic of said software application.

2. The method of claim 1 wherein said generating comprises:
maintaining in memory information indicative of said interactions;
accessing said memory to retrieve said information;
rendering a view of said information in a tabular format, wherein said view is an editing interface for said information;
receiving input through said interface instructing editing at least some of said information; and
saving said edited information in said memory, thereby modifying at least one of said interactions.

3. The method of claim 1, wherein said generating comprises:
rendering a thumbnail view of said elements in said dialog.

4. The method of claim 3 further comprising:
receiving input selecting an interaction; and
highlighting said selected element in said thumbnail view.

5. The method of claim 1, wherein said application is a website, and said elements are web pages.

6. The method of claim 1, wherein said application is an eLearning application, and said elements are slides, the progression of said slides determined by said interactions.

7. The method of claim 1 further comprising:
filtering said interactions in said dialog by type of interaction.

8. A method for editing an interactive application, said method comprising:
receiving input information specifying elements of said interactive application, said elements including end-user interactions;
saving said received input information in a memory;
retrieving at least some of said information that corresponds to said end-user interactions;
rendering a dialog interface of end-user interactions for a plurality of said elements, said dialog featuring a tabular format organized by individual end-user interactions and properties thereof, the tabular format including a row corresponding to each of said interactions and a plurality of columns, each column corresponding to one of the properties, wherein said columns comprise a column corresponding to a score property associated with one of said interactions and a column corresponding to a branching characteristic of said interactive application;
receiving editing input through said dialog interface to change at least one property of at least one of the end-user interactions and based on said retrieved information; and
editing said information in said memory in response to receiving said editing input,
wherein the rows corresponding to end-user interactions that are associated with an element of said interactive application are nested beneath a row in the dialog corresponding to the element, and
wherein rendering comprises providing a collapse command operative to hide rows corresponding to at least some individual end-user interactions.

9. The method of claim 8, wherein said rendering comprises: applying filtering to said interface of end-user interactions, said filtering applied by type of end-user interaction.

10. The method of claim 8 wherein receiving editing input through said dialog comprises:
receiving user selection input selecting one of said end-user interactions for editing; and
applying highlighting to said selection.

11. The method of claim 10, wherein said elements are visual elements, said method further comprising:
rendering a thumbnail interface of said elements in said dialog; and
applying highlighting to said selected interaction in said thumbnail interface.

12. The method of claim 8 wherein said end-user interactions determine a progression of elements in said application when said application is executed.

13. The method of claim 8 wherein said receiving input information is performed in an element-editing interface different from said dialog.

14. A computer program product having a non-transitory computer readable medium having computer program logic recorded thereon for creating user-interactive applications, said computer program product comprising:
code for providing an environment within which an operator enters input specifying elements of a user-interactive application, said elements including interactive actionable attributes;
code for rendering a dialog that displays information associated with said interactive actionable attributes for a plurality of said elements, the dialog including a row for each interactive actionable attribute and a plurality of columns, each column corresponding to said information associated with the interactive actionable attributes; and
code for receiving operator input through said dialog, said input through said dialog editing one or more of said interactive actionable attributes, wherein said columns comprise:
  a column corresponding to a score associated with one of said interactive actionable attributes, and
  a column corresponding to a branching characteristic of said user-interactive application,
  wherein rows for interactive actionable attributes that are associated with an element are nested beneath a row for in the dialog corresponding to the element, and
  wherein the dialog comprises a collapse command operative to hide at least one row of the plurality of rows.

15. The computer program product of claim 14 wherein said dialog is separate from an interface for creating said elements.

16. The computer program product of claim 14 wherein said code for receiving operator input through said dialog comprises:
  code for receiving user selection input selecting one of said interactive actionable attributes for editing; and
  code for applying highlighting to said selection.

17. The computer program product of claim 16, wherein said elements are visual elements, said computer program product further comprising:
  code for rendering a thumbnail interface of said elements in said dialog; and
  code for applying highlighting to said selected interactive actionable attributes in said thumbnail interface.

* * * * *